United States Patent
Erbguth et al.

(10) Patent No.: US 8,382,638 B2
(45) Date of Patent: Feb. 26, 2013

(54) METHOD FOR CONTROLLING A DRIVE UNIT OF A MOTOR VEHICLE

(75) Inventors: Carsten Erbguth, Munich (DE); Florian Gramer, Munich (DE); Mathieu Front, Dachau (DE); Gerd Kraemer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/473,856

(22) Filed: May 17, 2012

(65) Prior Publication Data

US 2012/0231926 A1    Sep. 13, 2012

Related U.S. Application Data

(63) Continuation of application No. PCT/EP2010/068271, filed on Nov. 26, 2010.

(30) Foreign Application Priority Data

Nov. 27, 2009  (DE) .......................... 10 2009 056 160

(51) Int. Cl.
*B60W 10/08* (2006.01)
(52) U.S. Cl. ............................................................. 477/4
(58) Field of Classification Search .............. 303/3, 152; 477/4; 180/65.265
See application file for complete search history.

(56) References Cited

U.S. PATENT DOCUMENTS

| | | | | |
|---|---|---|---|---|
| 4,962,969 A * | 10/1990 | Davis | .................................. | 303/3 |
| 5,842,534 A | 12/1998 | Frank | | |
| 5,853,229 A * | 12/1998 | Willmann et al. | ................. | 303/3 |
| 6,176,556 B1 * | 1/2001 | Kizer | ............................. | 303/152 |
| 6,454,364 B1 * | 9/2002 | Niwa et al. | .................... | 303/152 |
| 6,508,523 B2 * | 1/2003 | Yoshino | ......................... | 303/152 |
| 6,631,960 B2 * | 10/2003 | Grand et al. | ................... | 303/152 |
| 6,655,754 B2 * | 12/2003 | Crombez et al. | ............. | 303/152 |
| 6,705,686 B2 * | 3/2004 | Hilbert | ......................... | 303/152 |
| 6,811,229 B2 * | 11/2004 | Soga | ............................. | 303/152 |
| 7,275,795 B2 * | 10/2007 | Nishina et al. | ................ | 303/186 |
| 7,284,803 B2 * | 10/2007 | Matsuura et al. | ............. | 303/152 |
| 7,359,785 B2 * | 4/2008 | Yoshida et al. | ................. | 701/53 |
| 7,571,967 B2 * | 8/2009 | Saito et al. | ..................... | 303/152 |

(Continued)

FOREIGN PATENT DOCUMENTS

| | | |
|---|---|---|
| DE | 102 50 645 A1 | 7/2003 |
| DE | 103 24 948 A1 | 12/2004 |

(Continued)

OTHER PUBLICATIONS

German Search Report dated Sep. 2, 2010 with partial English translation (nine (9) pages).

(Continued)

*Primary Examiner* — Dirk Wright
(74) *Attorney, Agent, or Firm* — Crowell & Moring LLP

(57) ABSTRACT

A method is provided for controlling a drive unit of a motor vehicle with an automatic or automated transmission. The drive unit includes at least one drive motor, which generates a drive torque in an overrun mode. The drive torque acts as a drag torque or as a creep torque on the drive wheels as a function of the current speed. The level of the drive torque in the overrun mode can be at least partially controlled by actuating a brake pedal. The drag torque applied to the drive wheels in the overrun mode can be controlled by actuating the brake pedal in such a way that a reduced drag torque dependent on the actuation of the brake pedal is applied to the drive wheels.

17 Claims, 1 Drawing Sheet

U.S. PATENT DOCUMENTS

| | | | |
|---|---|---|---|
| 7,878,605 B2 * | 2/2011 | Kokubo et al. | 303/151 |
| 7,967,397 B2 * | 6/2011 | Zillmer et al. | 303/151 |
| 8,040,084 B2 * | 10/2011 | Muta | 318/376 |
| 8,042,632 B2 * | 10/2011 | Wisniewski | 180/65.265 |
| 8,152,245 B2 * | 4/2012 | Lubbers | 303/151 |
| 2006/0220452 A1 * | 10/2006 | Emmerich et al. | 303/152 |
| 2009/0099744 A1 * | 4/2009 | Karnjate et al. | 701/70 |
| 2009/0299591 A1 * | 12/2009 | Broeckel et al. | 701/70 |
| 2010/0036577 A1 * | 2/2010 | Kodama et al. | 701/76 |
| 2010/0076657 A1 * | 3/2010 | Jinno et al. | 701/70 |
| 2010/0299036 A1 * | 11/2010 | Vespasien | 701/70 |
| 2011/0254358 A1 * | 10/2011 | Strengert et al. | 303/3 |
| 2012/0073922 A1 * | 3/2012 | Kaestner et al. | 188/70 R |
| 2012/0074767 A1 * | 3/2012 | Nishio et al. | 303/3 |

FOREIGN PATENT DOCUMENTS

| | | |
|---|---|---|
| DE | 10 2005 039 314 A1 | 2/2007 |
| DE | 10 2005 046 893 A1 | 4/2007 |
| DE | 10 2005 054 614 A1 | 5/2007 |
| DE | 11 2007 003 093 T5 | 10/2009 |
| FR | 2 923 422 A1 | 5/2009 |

OTHER PUBLICATIONS

International Search Report dated Feb. 15, 2012 with English translation (four (4) pages).

* cited by examiner

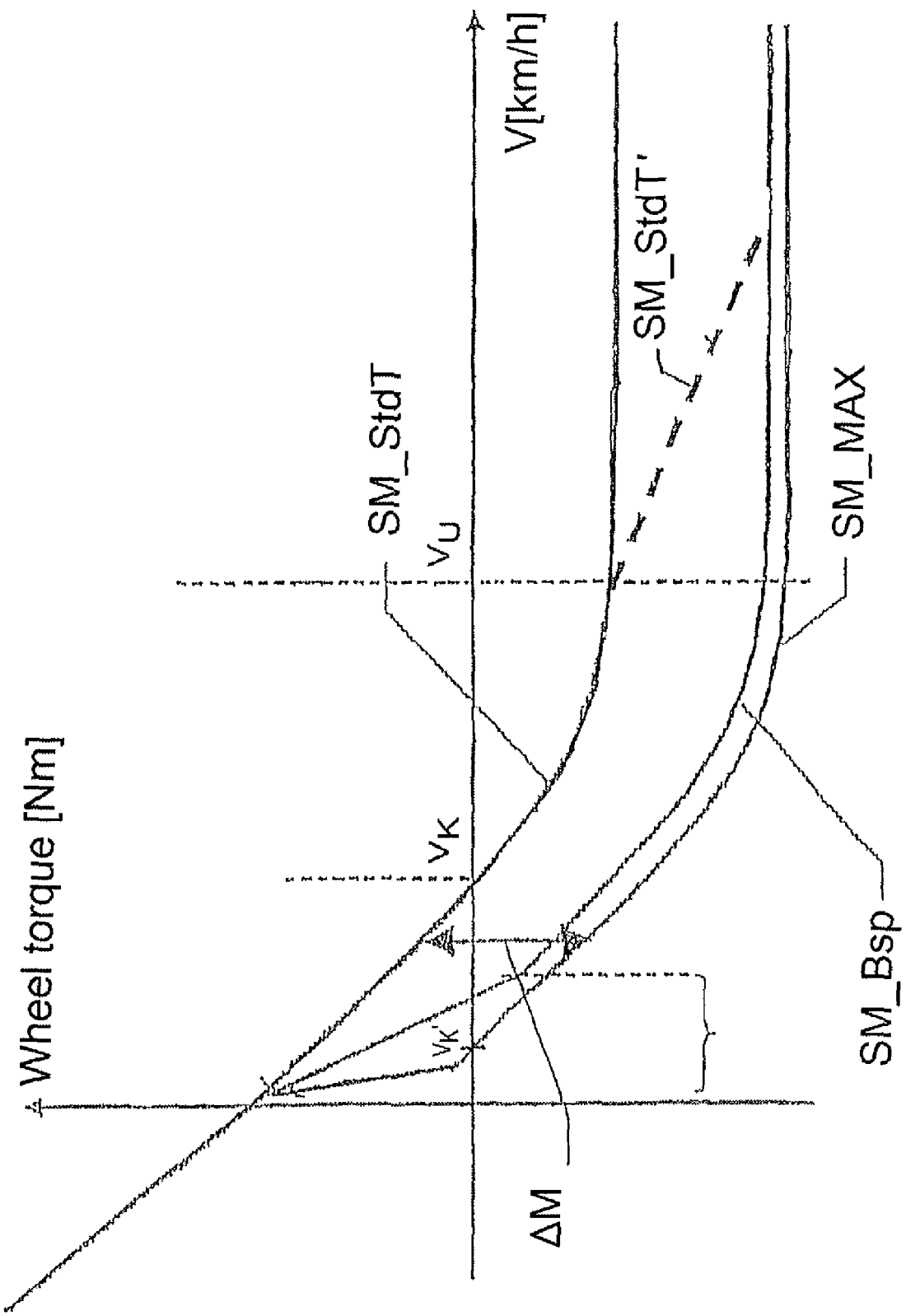

METHOD FOR CONTROLLING A DRIVE UNIT OF A MOTOR VEHICLE

CROSS-REFERENCE TO RELATED APPLICATIONS

This application is a continuation of PCT International Application No. PCT/EP2010/068271, filed Nov. 26, 2010, which claims priority under 35 U.S.C. §119 from German Patent Application No. DE 10 2009 056 160.9, filed Nov. 27, 2009, the entire disclosures of which are herein expressly incorporated by reference.

BACKGROUND AND SUMMARY OF THE INVENTION

The invention relates to a method for controlling a drive unit of a motor vehicle with an automatic transmission or automated transmission wherein the drive unit includes at least one drive motor, which generates a drive torque in overrun mode. The drive torque acts as a drag torque or as a creep torque on the drive wheels as a function of the current speed, and the level of the drive torque in overrun mode can be at least partially controlled by actuating a brake pedal.

At the present time a wide range of methods and systems have been developed and, to some extent, have also been implemented to reduce the consumption of fuel and the emission of pollutants. In particular, special consideration has been given to vehicles with a hybrid drive or an electric drive, so that the vehicle can run at least partially on electric power alone and, as a result, the emission of pollutants can be reduced.

Smaller energy savings are also possible in the area of energy recuperation technology. In this case an electric motor converts the kinetic energy in overrun mode and/or on application of the brake into electric energy that can then be stored in an energy accumulator (energy storage device). However, modern brake energy recuperation systems can recover energy only prior to reaching a relatively high speed threshold, because the recuperation is terminated at this speed threshold. If, in the case of vehicles with an automatic transmission or automated transmissions, the brake energy recuperation is terminated before the transition into the creep mode (positive drive torque), then the driver, allocating the brake pedal sensation to the vehicle deceleration, perceives this situation to be unpleasant. In order to avoid this problem, modern brake energy recuperation systems have already been improved in such a way that one starts below the upper speed threshold to reduce the maximum recuperation torque linearly with the speed to zero prior to reaching a lower speed threshold. This strategy does, in fact, relieve the aforementioned driver irritation, but at the same time it reduces the energy efficiency of the recuperation, because the recuperation takes place within a smaller speed range.

Independently of such recuperation systems, DE 10 2005 046 893 A1 discloses a method for controlling an automatic power shift transmission, wherein the level of the creep torque that acts on the drive wheels when the vehicle is in overrun mode can be controlled by the driver by a corresponding activation of a brake element in a free play range. A requested reduced creep torque is implemented by at least partially opening a friction clutch element assigned to the engaged gear ratio.

The object of the present invention is to provide a method that is intended for controlling a drive unit of a motor vehicle in overrun mode and that is significantly improved with respect to energy recovery and/or with respect to energy consumption.

This and other objects are achieved with a method for controlling a drive unit of a motor vehicle with an automatic transmission or automated transmission, wherein the drive unit includes at least one drive motor, which generates a drive torque in overrun mode. The drive torque acts as a drag torque or as a creep torque on the drive wheels as a function of the current speed, and the level of the drive torque in overrun mode can be at least partially controlled by actuating a brake pedal. The drag torque applied to the drive wheels in overrun mode is controllable by actuating the brake pedal such that a reduced drag torque dependent on the actuation of the brake pedal is applied to the drive wheels.

The invention is based on a drive control for a motor vehicle with an automatic transmission or automated transmission. This drive control generates a speed-dependent drive torque in overrun mode—that is, when the driver does not actuate the gas pedal—and this drive torque acts as a decelerating drag torque or as a driving creep torque on the drive wheels as a function of the current speed of the vehicle. The invention is characterized in that the level of the drive torque acting on the drive wheels in overrun mode (and, thus, also the speed of the vehicle during overrun mode) can be at least partially controlled by the driver by actuating the brake pedal (in the free play range). The object of such an approach is to ensure that, in particular, the drag torque applied to the drive wheels in overrun mode can be controlled by actuating the brake pedal (in the free play range) such that a reduced drag torque dependent on the actuation of the brake pedal is applied to the drive wheels. It is an advantage that the creep torque applied to the drive wheels in creep mode can also be controlled by actuating the brake pedal in such a way that a reduced creep torque dependent on the actuation of the brake pedal (in the free play range) is applied to the drive wheels. This means that the driver can control the vehicle speed by actuating the brake pedal without simultaneously working against the drive torque with the friction brake.

The range, in which the driver can impress a negative torque on the drive by way of the brake pedal (using the free play range), can be broadened by reducing the drive torque that is generated in overrun mode or, more specifically, applied to the drive wheels (depending on the speed of the vehicle, the drag torque or the creep torque).

The drive torque acting on the drive wheels in overrun mode can be reduced in a number of ways. One advantage is that the reduced drag torque and/or the reduced creep torque that is applied to the drive wheels can be at least partially generated by reducing the drive torque, generated by the drive motor, by a recuperation torque, which is predetermined as a function of the actuation of the brake pedal (in particular, in the free play range), especially if the drive torque, applied in overrun mode, is made available by an internal combustion engine. This means that the decelerating torque, requested by the driver by use of the brake pedal, is balanced with the driving drag torque or creep torque, delivered by the drive, in accordance with the following formula:

$$M_{drive} = M_{overrun/creep} + M_{brake} \text{ with } \mathrm{sgn}(M_{brake}) = -1$$

In this context the recuperation torque can be generated by an electric motor in generator mode (recuperation mode). The advantage lies in the fact that the recuperated energy can be stored and then made available again later for the drive or other systems.

As an alternative or in addition—especially if the applied drive torque is made available by an electric motor and the level of drive torque is variable—the reduced drag torque and/or the reduced creep torque that is applied to the drive wheels can be at least partially generated by way of the drive motor by applying a drive torque, which is reduced by a predetermined reducing torque. That is, the drive motor generates a smaller drive torque from the beginning.

The level of the recuperation torque (according to the first alternative) and/or the level of the reducing torque (according to the second alternative) can be preset best as a function of the actuation travel and/or the pressure applied to the brake pedal, especially in such a way that a larger recuperation torque and/or reducing torque is preset with increasing deflection and/or with increasing pressure. In addition, the level of the recuperation torque and/or the level of the reducing torque can also be influenced by other factors, such as the current speed. In particular, at very low speeds (near zero) it is possible to achieve, on the one hand, a gentle transition from the drag torque to the creep torque and, on the other hand, a recuperation up to the stop mode by suitably influencing the level of the recuperation torque and/or the reducing torque.

The inventive method and its advantageous embodiments can be carried out by an implemented algorithm or a corresponding module configuration in a control device—in particular, in a motor control device—that is provided for this purpose.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE is a graph plotting a drive torque and/or a wheel torque, which is applied to the drive wheels, in overrun mode as a function of the speed v.

DETAILED DESCRIPTION OF THE DRAWING

As plotted in the FIGURE, SM_StdT denotes the resulting overrun torque profile taking into consideration one recuperation possibility. In this case the decelerating drag torque switches over into a driving creep torque below the speed threshold $v_K$. The drag torque SM_StdT can be adjusted to an almost constant value prior to reaching a speed threshold $v_u$. The dashed line SM_StdT' shows a progression of the recuperation torque without the use of the proposed algorithm and, thus, the closed loop control of the drag torque.

SM_MAX denotes an overrun torque, which is maximally adjustable due to the invention, through suitable actuation of the brake pedal; and this overrun torque can be reached by maximum recuperation. The height of the double arrow ΔM shows very clearly the amount by which the overrun torque SM_StdT, which is applied without actuation of the brake pedal, can be reduced by suitably actuating the brake pedal in the free play range. A decrease in the overrun torque SM_StdT also shifts the speed threshold $v_K'$; and on undershooting this speed threshold the decelerating drag torque switches over into a driving creep torque. The line SM_Bsp represents one example of the drag torque profile, which is arranged between the drag torque SM_StdT, which can be reached without actuating the brake pedal, and the drag torque SM_MAX, which can be reached by means of maximum recuperation.

In summary, a suitable recuperation device allows energy to be recuperated up to or just shortly before the stop mode of the vehicle; and, as a result, the energy efficiency of the vehicle is increased. At the same time the brake sensation for the driver is comfortable and pleasant as well as repeatable. For this purpose the range, in which the driver can impress a negative torque on the drive by actuating the brake pedal, is expanded. In the transition to the stop mode the driver has to take over hydraulically in order to ensure that the vehicle is stopped. In order to make this transition comfortable for the driver, the amount of recuperative torque decreases in parallel with a decrease in the speed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a drive unit of a motor vehicle equipped with an automatic or automated transmission, the method comprising the acts of:
   generating a drive torque, via a drive motor, by the drive unit in an overrun mode of the vehicle, the drive torque acting as a drag torque or a creep torque on drive wheels as a function of a current speed of the vehicle; and
   controlling, by actuation of a brake pedal, the drag torque applied to the drive wheels in the overrun mode such that a reduced drag torque dependent on the brake pedal actuation is applied to the drive wheels.

2. The method according to claim 1, wherein the reduced drag torque, dependent on the brake pedal actuation in a free play range of the brake pedal, is applied to the drive wheels.

3. The method according to claim 1, wherein the creep torque applied to the drive wheels in the overrun mode is controllable via actuation of the brake pedal such that a reduced creep torque dependent on the brake pedal actuation is applied to the drive wheels.

4. The method according to claim 3, wherein the reduced creep torque is dependent on the brake pedal actuation in a free play range of the brake pedal.

5. The method according to claim 2, wherein the creep torque applied to the drive wheels in the overrun mode is controllable via actuation of the brake pedal such that a reduced creep torque dependent on the brake pedal actuation is applied to the drive wheels.

6. The method according to claim 4, wherein the reduced creep torque is dependent on the brake pedal actuation in a free play range of the brake pedal.

7. The method according to claim 1, wherein at least one of the reduced drag torque and a reduced creep torque applied to the drive wheels is at least partially generated by reducing the drive torque, generated by the drive motor, by a recuperation torque; and
   wherein the recuperation torque is predetermined as a function of the brake pedal actuation.

8. The method according to claim 7, wherein the recuperation torque is predetermined as a function of the brake pedal actuation in a free play range of the brake pedal.

9. The method according to claim 8, wherein the recuperation torque is generated by an electric motor operating in a generator mode.

10. The method according to claim 7, wherein the recuperation torque is generated by an electric motor operating in a generator mode.

11. The method according to claim 1, wherein at least one of the reduced drag torque and a reduced creep torque applied to the drive wheels is at least partially generated via the drive motor by applying a drive torque, the drive torque being reduced by a predetermined reducing torque.

12. The method according to claim 3, wherein a level of the reducing creep torque is preset as a function of at least one of an actuation travel and a pressure applied to the brake pedal.

13. The method according to claim 12, wherein the actuation travel and/or the pressure applied to the brake pedal occurs in a free play range of the brake pedal.

14. The method according to claim 7, wherein a level of the recuperation torque is preset as a function of at least one of an actuation travel and a pressure applied to the brake pedal.

15. The method according to claim 14, wherein the actuation travel and/or the pressure applied to the brake pedal occurs in a free play range of the brake pedal.

16. The method according to claim 12, wherein the level of the reducing torque is preset additionally as a function of the current speed of the vehicle.

17. The method according to claim 14, wherein the level of the recuperation torque is preset additionally as a function of the current speed of the vehicle.

* * * * *